United States Patent
Hüger et al.

(10) Patent No.: US 12,036,975 B2
(45) Date of Patent: Jul. 16, 2024

(54) PARKING A MOTOR VEHICLE

(71) Applicant: Volkswagen Aktiengesellschaft, Wolfsburg (DE)

(72) Inventors: Philipp Hüger, Rühen (DE); Torsten Büschenfeld, Uetze (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 778 days.

(21) Appl. No.: 16/651,477

(22) PCT Filed: Sep. 12, 2018

(86) PCT No.: PCT/EP2018/074573
§ 371 (c)(1),
(2) Date: Mar. 27, 2020

(87) PCT Pub. No.: WO2019/063286
PCT Pub. Date: Apr. 4, 2019

(65) Prior Publication Data
US 2020/0262417 A1    Aug. 20, 2020

(30) Foreign Application Priority Data
Sep. 29, 2017    (DE) .......................... 102017217441.2

(51) Int. Cl.
*B60W 30/06*     (2006.01)
*B60W 10/20*     (2006.01)
*B60W 50/00*     (2006.01)

(52) U.S. Cl.
CPC ............ *B60W 30/06* (2013.01); *B60W 10/20* (2013.01); *B60W 2050/0014* (2013.01);
(Continued)

(58) Field of Classification Search
CPC ............. B60W 30/06; B60W 2554/60; B60W 2050/0052; B60W 2422/70; B60W 2520/16
See application file for complete search history.

(56) References Cited

U.S. PATENT DOCUMENTS

| 2002/0169537 A1 | 11/2002 | Regensburger et al. |
| 2005/0203686 A1 | 9/2005 | Maier et al. |

(Continued)

FOREIGN PATENT DOCUMENTS

| DE | 10251558 A1 | 5/2004 |
| DE | 102004001555 A1 | 8/2005 |

(Continued)

OTHER PUBLICATIONS

Office Action from corresponding German Application No. 10 2017 217 441.2, printed Jul. 5, 2018.

*Primary Examiner* — Jelani A Smith
*Assistant Examiner* — Toya Pettiegrew
(74) *Attorney, Agent, or Firm* — Peter Zura; LOZA & LOZA, LLP

(57) ABSTRACT

A method for parking a motor vehicle curbside by means of an apparatus, wherein, in a predetermined parking area, a height of a curb is detected by a first detection device of the apparatus, a profile of wheel pulses of a respective wheel sensor of at least one wheel is detected during a driving maneuver for curb parking in the predetermined parking area, and a crossing of the curb edge by the at least one wheel is detected by a second detection device of the apparatus. During the crossing of the curb edge, a correction measure for an odometry module of the apparatus is carried out as a function of the height of the curb.

27 Claims, 4 Drawing Sheets

(52) U.S. Cl.
CPC ............... *B60W 2050/0052* (2013.01); *B60W 2420/403* (2013.01); *B60W 2420/54* (2013.01); *B60W 2422/70* (2013.01); *B60W 2520/16* (2013.01); *B60W 2554/60* (2020.02)

(56) References Cited

U.S. PATENT DOCUMENTS

| | | | |
|---|---|---|---|
| 2005/0231341 A1 | 10/2005 | Shimizu | |
| 2006/0250143 A1* | 11/2006 | Moon | G01D 5/24 |
| | | | 324/674 |
| 2011/0199236 A1* | 8/2011 | Hauber | B62D 15/027 |
| | | | 340/932.2 |
| 2014/0330410 A1* | 11/2014 | Lochmann | G06V 40/23 |
| | | | 700/91 |
| 2016/0147915 A1* | 5/2016 | Pope | G06F 30/13 |
| | | | 703/1 |
| 2017/0176988 A1* | 6/2017 | Noessner | G05D 1/0223 |
| 2017/0261994 A1* | 9/2017 | Simmons | G05D 1/0891 |
| 2017/0344836 A1* | 11/2017 | Prinet | G06V 20/58 |

FOREIGN PATENT DOCUMENTS

| | | | | |
|---|---|---|---|---|
| DE | 10114932 B4 | 9/2005 | | |
| DE | 102005015088 A1 | 11/2005 | | |
| DE | 102009003216 A1 | 11/2010 | | |
| DE | 102009046656 A1 | 5/2011 | | |
| DE | 102010001922 A1 | 8/2011 | | |
| DE | 10201101163 A1 | 11/2012 | | |
| DE | 102011101163 A1 * | 11/2012 | ........... | B62D 15/027 |
| DE | 102012014809 A1 | 1/2014 | | |
| DE | 102013220931 A1 | 4/2015 | | |
| DE | 102014111012 A1 | 2/2016 | | |
| DE | 102015118471 A1 | 5/2017 | | |
| DE | 102016104574 A1 | 9/2017 | | |
| DE | 102016111079 A1 | 12/2017 | | |

* cited by examiner

PARKING A MOTOR VEHICLE

REFERENCE TO CO-PENDING APPLICATIONS

This patent application claims priority to PCT/EP2018/074573, filed on Sep. 12, 2018, which claims priority to German patent application DE 10 2017 217 441.2, filed on Sep. 29, 2017, the entire disclosures of these applications being hereby incorporated by reference.

TECHNICAL FIELD

This patent document relates to parking a motor vehicle curbside, and more particularly, to measuring the distance of travel for the vehicle while parking.

BACKGROUND

The position and orientation of a motor vehicle can be tracked during a driving maneuver by means of an odometric module or odometry module. The principle of odometric methods is to determine a current position from a distance traveled. In motor vehicles, the number of wheel pulses from wheel sensors and the steering angle of the steering wheel can be tracked, among other things. This type of position determination is used in particular in parking assistance systems, such as parking steering assistants, for example. In this case, however, there is a problem when an additional rotation of a wheel takes place upon travelling over the edge of a curb; this does not result in a change in the distance, but only a change in height. This proves to be problematic because motor vehicles generally use 2D odometry methods. In other words, a change in height is not taken into account and the additional wheel pulses are thus attributed to movements of the motor vehicle in the plane, although the additional wheel path runs in a height direction. This leads to the calculated position of the motor vehicle deviating from the actual position. In the case of parking steering assistants, this can ultimately lead to the motor vehicle having a position and/or orientation at the end of a parking process that deviates from a target position.

DE 10 2013 220 931 A1 describes a method and a device for assisting in the approach of a motor vehicle to a curb. In the method, a curb located in the vicinity of the motor vehicle is detected, and at least one operating parameter of the motor vehicle is adapted in such a way that a shaking of the motor vehicle associated with the collision with the curb is reduced.

DE 10 2009 046 656 A1 describes a method for recognizing a parking space suitable for parking a vehicle. During the method, it is checked whether a parking space has a curb which must be overcome with at least one wheel of the vehicle in order to reach a parking position. Depending on the selected execution of the method, the parking space may be discarded if it is necessary to drive over a curb to reach a parking position, or if it has a height which is above a predetermined maximum height.

DE 10 2010 001 922 A1 describes a method and a device for parking a motor vehicle. In this case, the magnitude of a steering angle of at least one environmental situation of the motor vehicle determined by means of a sensor is set in order to prevent the vehicle from rolling away. A vehicle inclination, and the position and height of a curb are taken into account.

DE 10 2015 118 471 A1 describes a method for at least semi-autonomous maneuvering of a motor vehicle with an active chassis system. The method provides for a position value of the motor vehicle to be continuously determined during a driving maneuver of the motor vehicle by means of odometry. The position value is corrected on the basis of a detected change in height of at least one damping device, which is detected when a wheel of the motor vehicle moves over a curb.

DE 10 2016 104 574 A1 discloses a method for at least semi-autonomous parking of a motor vehicle. In the method, a torque which is transmitted to at least one wheel when a transition is overcome is predetermined before the beginning of the overcoming, as a function of at least one parameter characterizing a parking space and/or the motor vehicle.

DE 10 2016 111 079 A1 describes a method for object height detection of an object in the vicinity of a motor vehicle. In this case, a camera on the motor vehicle records a first two-dimensional image of an object from a first relative position between the motor vehicle and the object, and by comparing the first two-dimensional image with a second two-dimensional image of the object from a second relative position between the motor vehicle and the object, a height of the object is determined by a control device.

DE 10 2014 111 012 A1 describes a method for assisting a driver of a motor vehicle in driving out of a parking space. In the method, at least one image of a surrounding area of the motor vehicle is furnished by means of a camera of the motor vehicle, and at least one delimiting element delimiting the parking area is determined on the basis of the image by means of an evaluation device of the motor vehicle.

DE 10 2012 014 809 A1 discloses a method for recognizing when a curb is driven over. The method provides for identifying when the curb is driven over when one wheel has a positive acceleration for a predetermined time interval and at least one of the other wheels has a negative acceleration for the same time interval. The detection of when a curb is driven over is used to correct an odometric position determination and to calculate trajectories of a parking assistant.

DE 10 2011 101 163 A1 describes a method for determining the position of a vehicle. In the method, a height distance or a change in the height distance of at least one wheel from a roadway level is determined by means of a device for detecting a height distance.

DETAILED DESCRIPTION

Figure 1:
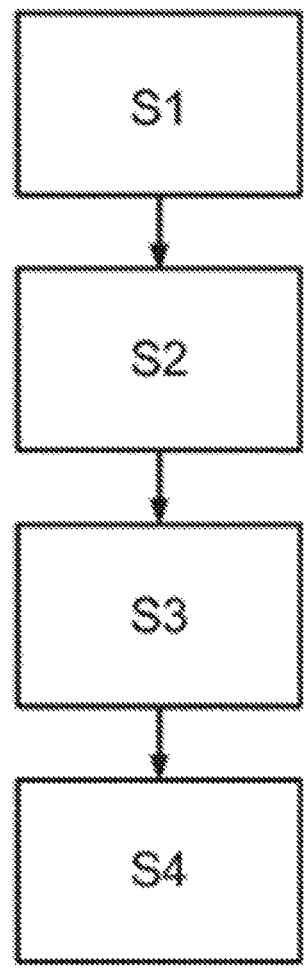
FIG. 1 shows a sequence of a method of measuring the lateral distance of travel for a motor vehicle.

Various embodiments are described in detail with reference to the drawings. Reference to the drawings and the various embodiments in this written specification does not limit the scope of the claims attached hereto. Additionally, the examples set forth in this written description are not intended to be limiting and merely set forth some of the many possible embodiments for the appended claims.

For purposes of this patent document, the terms "or" and "and" shall mean "and/or" unless stated otherwise or clearly intended otherwise by the context of their use. Whenever appropriate, terms used in the singular also will include the plural and vice versa. Use of the term "a" means "one or more" unless stated otherwise or where the use of "one or more" is clearly inappropriate. Use of the term "comprise," "comprises," "comprising," "include," "includes," "including," "having," and "has" are interchangeable and are not intended to be limiting. For example, the term "including" shall mean "including, but not limited to." The term "such as" also is not intended to be limiting.

Terms such as "substantially" or "about" when used with values or structural elements provide a tolerance that is ordinarily found during testing and production due to variations and inexact tolerances in factors such as materials and equipment. These terms also provide a tolerance for variations due to environmental conditions such as temperature and humidity. Such variations also can be due to normal wear and tear over the life of apparatuses that embody the appended claims.

In at least some example embodiments, a predetermined parking area for the motor vehicle is detected, and a height of a curb in the predetermined parking area is detected by a first detection device of the apparatus. The predetermined parking area can be prespecified by a further device of the motor vehicle, or can have already been identified by the first detection device of the apparatus. During a driving maneuver in the predetermined parking area, a profile of wheel pulses from the wheel sensor of at least one wheel is detected. A crossing of the curb by the at least one wheel is detected by a second detection device of the apparatus. During the crossing of the curb, a correction measure for an odometric module or odometry module of the motor vehicle is carried out as a function of the height of the curb. In other words, during the method, a predetermined parking area is checked by a first detection device for the presence of a curb, and the height of the curb is optionally detected. If the motor vehicle performs a driving maneuver in the predetermined parking area, a profile of wheel pulses of at least one wheel of the motor vehicle is detected. As soon as the at least one wheel of the motor vehicle crosses the curb, this is detected by a second detection device. As long as the at least one wheel crosses the curb, a correction measure is carried out for the odometry module of the device, and a deviation resulting from the height of the curb is corrected. This has the advantage that crossing a curb does not lead to an incorrect position determination of the motor vehicle. For example, it is possible for a height of a curb in a parking area to be detected. A parking area can be a parking area which can have predetermined minimum dimensions, for example. The detection of the height of the curb can be detected by a first detection device, which can be, for example, a camera of an external camera system of a motor vehicle. The height can be determined, for example, using a predetermined image evaluation procedure. The motor vehicle can perform a driving maneuver which takes place at least partially within the parking area. For example, a wheel pulse of a wheel can be continuously detected by means of a wheel pulse generator. As soon as the wheel crosses the curb, this can be detected by a second detection device. The second detection device can comprise, for example, an inclination sensor which detects the crossing of the curb by the at least one wheel by detecting a predetermined change in the inclination of the motor vehicle. It may be that, during the crossing of the curb, a correction measure is carried out as a function of the height of the curb, enabling a correct position determination by an odometric module of the motor vehicle.

The height of the curb is detected by the first detection device by means of photogrammetric methods. In other words, at least one or more images of the curb are captured by the first detection device, and from these, the height of the curb and/or the spatial profile of the curb in the parking area is/are detected by means of photogrammetric methods. This has the advantage that existing cameras of an all-round camera system of a motor vehicle, which are already installed in some motor vehicles, can be used. For example, it is possible that a side camera of a top view system (a device for generating an artificial bird's eye view of the motor vehicle) is used to record images of the parking area and to evaluate these using photogrammetric methods in order to determine the profile and/or the height of a curb.

In at least some example embodiments, part of the correction measure during the crossing of the curb is that the detected profile of the wheel pulses is adjusted by a height fraction of the profile of the wheel pulses due to the height of the curb, and is used in the odometry module to determine a motor vehicle position. In other words, the correction measure consists of using a corrected profile of the wheel pulses in the odometry module instead of the detected profile of the wheel pulses in order to determine a motor vehicle position. The corrected profile is based on the detected profile of the wheel pulses, in which a height fraction due to the height of the curb has been eliminated. This has the advantage that the odometry module can determine a motor vehicle position directly. For example, it is possible that a portion of wheel pulses resulting from the height of the curb is filtered out or suppressed when crossing the curb, and only the remaining wheel pulses are used in the odometry module to determine the motor vehicle position.

In at least some example embodiments, part of the correction measure during the crossing of the curb is that the profile of the wheel pulses detected while crossing the curb is used in the odometry module to determine a provisional motor vehicle position. The provisional motor vehicle position is then adjusted by a height fraction of the profile of the wheel pulses caused by the height of the curb. In other words, a provisional motor vehicle position, which is based on the detected wheel pulses, is determined in the odometry module in a first step. The provisional motor vehicle position differs from the actual motor vehicle position due to the problem mentioned at the outset. For this reason, the provisionally determined motor vehicle position is adjusted, and this adjustment is a function of a height fraction of the profile of the wheel pulses caused by the height of the curb. This has the advantage that a deviation due to the higher proportion of the profile of the wheel pulses is subsequently corrected. It is thus possible, in a first step, as is generally conventional, to calculate the provisional motor vehicle position on the basis of the detected profile of the wheel pulses. The provisional motor vehicle position may be shifted, since a longer travel distance is assumed due to the additional wheel pulses. The provisional motor vehicle position can therefore be in front of an actual motor vehicle position. In a second step, the correct motor vehicle position can be determined by subtracting the additional wheel path.

In at least some example embodiments, the correction measure takes into account a spatial profile or height profile of the curb in the predetermined parking area while crossing the curb. In other words, the correction takes place not only as a function of the height of the curb, but also as a function of the spatial profile of the curb. This has the advantage that a continuous correction of the motor vehicle position can be carried out. It is possible in this way for a profile of the height-related deviations to be calculated as part of the correction measure from the detected spatial profile of the curb and a direction of travel.

In at least some example embodiments, the photogrammetric method is a structure-from-motion method in a 3D mode. In other words, the photogrammetric method is a method which generates a three-dimensional model from at least two images of an object, which were taken from different positions, which is suitable for determining the spatial profile of the curb in the parking area and/or determining the height of the curb. This has the advantage that three-dimensional detection of the parking area is made possible by means of a three-dimensional reconstruction method.

In at least some example embodiments, the photogrammetric method is a structure-from-motion method in a 2D/3D hybrid mode. In other words, the photogrammetric method is a method in which edges are first recognized in a two-dimensional image. A plausibility check is carried out for the detected edges to determine whether it can be a curb. If this is the case, the corresponding parking area is measured three-dimensionally using a structure-from-motion method. This has the advantage that only a parking area in which a curb is located is detected three-dimensionally, thereby reducing the computing effort required.

In at least some example embodiments, the photogrammetric method is a two-dimensional evaluation method, wherein a profile and/or a height of the curb is determined in a two-dimensional image by means of machine learning methods. In other words, no transformation of one or more images into a 3D model is carried out. Rather, this data is determined directly from image information of the two-dimensional image. This has the advantage that no computationally complex transformation into a three-dimensional space is required. For example, it is possible that the height or the spatial profile of the curb is extracted from the image using a deep learning method.

In at least some example embodiments, the crossing of the curb is detected by the second detection device, by detecting a change in position and orientation of the motor vehicle. In other words, the second detection device is a device which is set up to detect a change in position and orientation of the motor vehicle. This has the advantage that it is possible to detect that a curb has been passed over on the basis of the change in height. It is thus possible for the second detection device to detect a longitudinal and/or transverse inclination of the motor vehicle, for example, before a driving maneuver such as a parking procedure is carried out, and to detect the crossing of the curb by recognizing that the longitudinal and/or transverse inclination of the motor vehicle changes by a predetermined quantity.

In at least some example embodiments, the crossing of the curb is detected by the second detection device by means of ultrasound signals. In other words, the second detection device is an echo sounder, which transmits and receives ultrasound signals, and from these, determines the position of the curb with respect to the motor vehicle. This approach detects when the curb is crossed by the at least one wheel. As such, the second detection device can continuously determine the position of the curb with respect to the motor vehicle during the driving maneuver, and can determine from it whether the curb is crossed by at least one wheel of the motor vehicle.

In at least some example embodiments, the driving maneuver is carried out partially or fully automatically by the apparatus. In other words, a longitudinal and/or transverse control of the motor vehicle is carried out by the apparatus. This has the advantage that the driver of the motor vehicle is assisted in performing the driving maneuver. As such, the apparatus calculates a target path or a target route for guiding the motor vehicle from a starting position to a parking position in the predetermined parking area, and the vehicle is guided along the calculated target path.

In at least some example embodiments, the predetermined parking area and/or a spatial profile of the curb edge is detected by means of a lateral detection device. In other words, a lateral detection device detects a predetermined detection area around the motor vehicle and detects whether a predetermined parking area and/or a curb is located in this detection area.

In at least some example embodiments, an apparatus is configured to continuously detect a height of a curb in a predetermined parking area by a first detection device, and to detect a profile of wheel pulses of at least one wheel during a driving maneuver in the predetermined parking area. The apparatus is configured to detect a crossing of the curb by the at least one wheel, using a second detection device, and to correct the profile of the wheel pulses detected while crossing the curb by a height fraction of the wheel pulses caused by the height of the curb. The apparatus is configured to detect the height using the first detection device, by means of a photogrammetric method.

In at least some example embodiments, the apparatus is included in a motor vehicle.

Referring now to the figures, FIG. 1 shows a sequence of operations explained below with reference to FIG. 1, FIG. 2, and FIG. 3. The method described can be, for example, a procedure of parking a motor vehicle 1 in a predetermined parking area 3—for example, a suitable parking space—which is detected by a lateral detection device 7 of the apparatus 2. In a first step, a height h of a curb 4, which is located in the predetermined parking area 3, can be determined by a first detection device 5 of the apparatus 2 (S1). The first detection device 5 can be a side camera, for example, which belongs to a camera-based parking assistant. The camera can take a two-dimensional image of the parking area while the motor vehicle 1 is next to the predetermined parking area 3 and can determine a spatial profile and a height h of the curb 4 in the predetermined parking area 3 by means of photogrammetric methods (S2). The apparatus 2 can determine a target path 8 which leads the motor vehicle 1 into the parking space from a starting position 9 to a parking position 10. The apparatus 2 can guide the motor vehicle 1 fully automatically along the target path 8 (S2). During the driving maneuver, the profile of the wheel pulses I can be determined by means of wheel pulse sensors 11 for each wheel 12 of the motor vehicle 1. A wheel pulse sensor 11 can be an inductive wheel sensor, for example. The profiles of the wheel pulses I of the four wheels 12 can be evaluated by an odometry module 13 of the apparatus 2 in order to be able to determine a motor vehicle position 15 of the motor vehicle 1. The apparatus 2 can comprise a microprocessor and/or a microcontroller. At least one wheel 12 can cross the curb 4 during the driving maneuver (S3). As a result, additional wheel pulses I are measured by the wheel pulse sensor 11 on the basis of the height difference. The crossing of the curb 4 by the at least one wheel 12 can be detected by a second detection device 6, which can be, for example, ultrasonic sensors and/or position sensors. As long as the respective wheel 12 crosses the curb 4, a correction measure can be carried out, wherein the additional wheel pulses $I_z$ attributable to the height difference are filtered out (S4), thereby producing a profile of filtered wheel pulses $I_x$. The number of wheel pulses $I_z$ to be filtered out can be a function of the detected height h of the curb 4. The profile of the filtered wheel pulses $I_x$ can be used to determine a movement in the plane. As such, the current vehicle position 15 is not disturbed due to the height difference. As an alternative to this, it is possible for the odometry module 13 to determine a provisional motor vehicle position 14 from the detected wheel pulses I and for the provisional motor vehicle position 14 to be subsequently corrected using the correction measure. During the correction measure, the provisional motor vehicle position 14 can be modified depending on the height h of the curb 4 and/or the spatial profile of the curb 4 such that it corresponds to the motor vehicle position 15.

Figure 2:
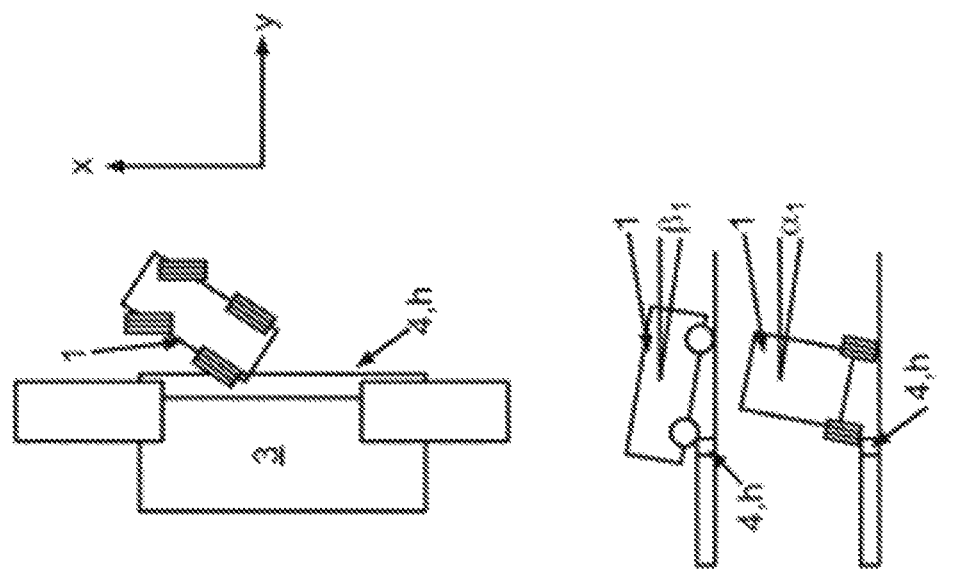
FIG. 2 shows a detection of a crossing of a curb during the method illustrated in FIG. 1.
Figure 2:
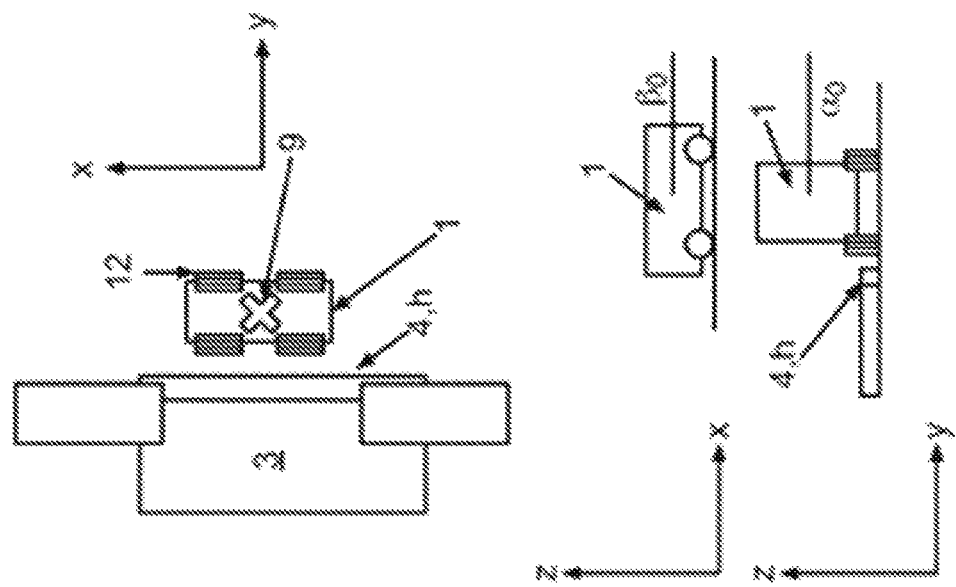

FIG. 2 shows a detection of crossing a curb 4. It may be that a position of the motor vehicle 1 comprising a longitudinal inclination β0 and a transverse inclination α0 is detected by the second detection device 6 before a driving maneuver is carried out. It may be the case that the motor vehicle 1 has a longitudinal inclination β0 and a transverse inclination α0, which are each 0°, before the driving maneuver is carried out. When a wheel 12 of the motor vehicle 1 crosses the curb 4, the longitudinal inclination and the transverse inclination of the motor vehicle 1 can change. At a time during the crossing of the curb 4, the longitudinal inclination can have a value β1 and the transverse inclination can have a value α1. On the basis of the change in the inclination values, the second detection device 6 can determine when and at what angle the curb 4 is crossed. It may be that the profile of the wheel pulse I during the crossing of the curb 4 is adjusted as a function of the changes in the transverse and longitudinal inclination and the curb height h. As such, for the position determination, the odometry module 13 only uses the wheel pulses Ix which result from a movement of the motor vehicle 1 in the plane.

Figure 3:
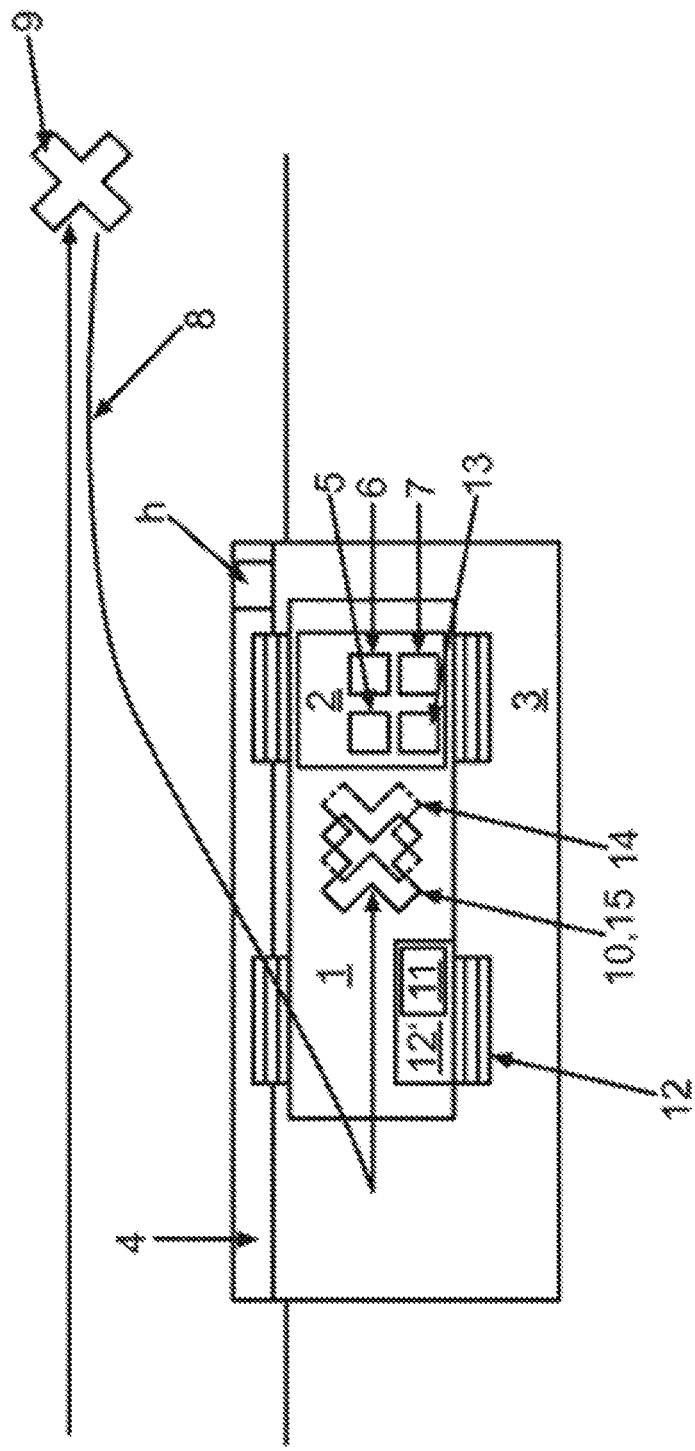
FIG. 3 shows a profile of a parking process as part of the method illustrated in FIG. 1.

FIG. 3 shows a profile of a parking procedure. The motor vehicle 1 can drive past parked cars and recognize a parking area 3 by means of a lateral detection device 7, which can detect parked vehicles and/or the position of curbs, for example, by means of ultrasound signals. A parking area 3 can comply with predetermined dimensions. In front of the parking area 3, there may be a curb 4 which must be crossed. The first detection device 5 can detect the height h of the curb 4 and its profile by means of a photogrammetric method. The method in this case can comprise a structure-from-motion method. The method may include a 2D mode, a 3D mode and/or a two-stage 2D/3D hybrid mode. The apparatus 2 can stop the motor vehicle 1 at a starting position 9 and calculate a target path 8 which leads the motor vehicle 1 to a parking position 10 in the parking area 3. The motor vehicle 1 can be guided along the target path 8 in a fully automated manner. In this case, the apparatus 2 can calculate a motor vehicle position 15 by means of a correction measure from a provisional motor vehicle position 14, which can be determined from the number of detected wheel pulses I. Before the initiation of the driving maneuver, the motor vehicle 1 can detect a transverse inclination and a longitudinal inclination of the motor vehicle 1 by means of a second detection device 6. The curb 4 can be crossed during the maneuver. According to the profile of the target path 8 and the height h of the curb 4, the longitudinal and transverse inclination of the motor vehicle 1 may change. This can be detected by the second detection device 6. Accordingly, the number of wheel pulses I detected while crossing the curb 4 can be modified. The apparatus 2 can determine the current position and orientation of the motor vehicle 1 from the number of detected wheel pulses I of all the wheels 12. As such, the motor vehicle 1 can be guided to the position to be reached.

Figure 4:
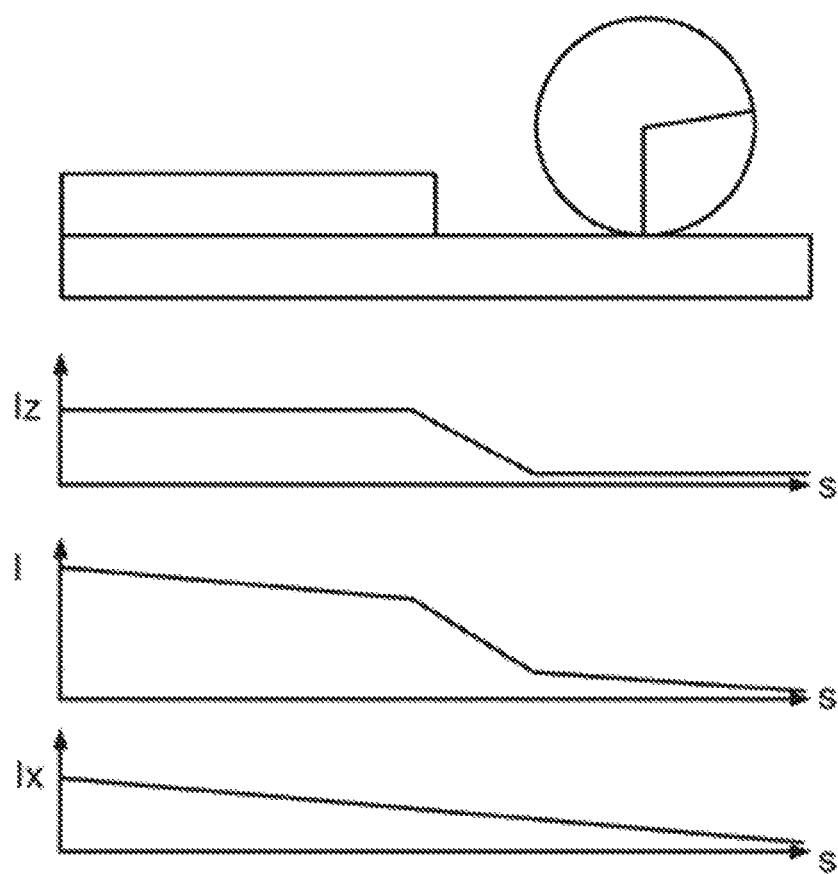
FIG. 4 shows a possible correction of the profile of the wheel pulses during the method illustrated in FIG. 1.

FIG. 4 shows a possible correction of the profile of the wheel pulses I. A wheel 12 is shown, which approaches a curb 4 of height h. The first diagram shows the number of wheel pulses I plotted against the distance traveled by the wheel 12 in the plane. For a movement on a flat surface, the number of detected wheel pulses I should be proportional to the distance traveled by the wheel 12. In the parking area 3 of the curb 4 crossing, there is a greater slope in the diagram because additional wheel pulses I are detected due to the height fraction. The second diagram shows the profile of the difference between the number of detected wheel pulses I and the profile of the number of wheel pulses I which would result for a flat surface. This profile can be calculated, for example, from detected changes in the transverse and longitudinal inclination and the detected curb height h. The apparatus 2 can modify the profile of the detected wheel pulses I in such a manner that the fraction of the wheel pulses I generated by the curb height h is calculated out of the profile of the detected wheel pulses I, and thus the profile of the number of the remaining wheel pulses I corresponds to the distance traveled in the plane.

Overall, the illustrated example enables a correct position determination of a motor vehicle 1 when a curb 4 is driven over.

The various embodiments described above are provided by way of illustration only and should not be construed to limit the scope of the claims attached hereto. Those skilled in the art will readily recognize various modifications and changes that may be made without following the example embodiments and applications illustrated and described herein, and without departing from the true spirit and scope of the following claims. It is intended that any such modifications and equivalents be included in the scope of the claims.

The invention claimed is:

1. A method for parking a motor vehicle curbside, the method comprising:
    photogrammetrically detecting a height of a curb, the curb being in a predetermined parking area;
    generating a profile of wheel pulses detected by a wheel sensor during a driving maneuver for curbside parking in the predetermined parking area; electronically detecting a crossing of an edge on the curb by the wheel, based on a change in position and orientation of the motor vehicle;
    during the crossing of the curb edge, carrying out a correction measure for an odometry module of the motor vehicle; and modifying the driving maneuver based on the correction measure to partially or fully automatically guide the vehicle during the crossing of the curb edge, the correction measure being a filtered function of the wheel pulses based on the photogrammetrically detected height of the curb edge.

2. The method according to claim 1, wherein the correction measure comprises adjusting the profile of the wheel pulses by a height fraction of the profile of the wheel pulses caused by the height of the curb, the method further comprising: determining a motor vehicle position using the odometry module, wherein the determining is based at least in part on the adjusted profile of the wheel pulses.

3. The method according to claim 2, wherein determining the motor vehicle position comprises:
    determining a provisional motor vehicle position based at least in part on the profile of wheel pulses; and
    adjusting the determined motor vehicle position based at least in part on a height fraction of the profile of the wheel pulses caused by the height of the curb.

4. The method according to claim 1, wherein carrying out the correction measure during the crossing of the curb is based at least in part on a spatial profile of the curb in the predetermined parking area.

5. The method according to claim 1, wherein photogrammetrically detecting the height of the curb comprises a structure-from-motion method in a three-dimensional (3D) mode.

6. The method according to claim 1, wherein photogrammetrically detecting the height of the curb comprises a structure-from-motion method, in a two-stage two-dimensional/three-dimensional (2D/3D) hybrid mode.

7. The method according to claim 1, wherein photogrammetrically detecting the height of the curb comprises a structure-from-motion method in a two-dimensional (2D) mode, and the height of the curb is detected via a machine learning method.

8. The method according to claim 1, wherein the crossing of the curb edge is detected by detecting a change in position and/or change in inclination of the motor vehicle.

9. The method according to claim 1, wherein the crossing of the curb edge is detected using ultrasound signals.

10. The method according to claim 1, further comprising executing the driving maneuver via the correction measure, the driving maneuver being at least partially automated.

11. The method according to claim 1, wherein detecting the height of the curb comprises detecting the height of a curb at least in part via a lateral detection device.

12. An apparatus for parking a motor vehicle curbside in a predetermined parking area, the motor vehicle having at least one wheel, the apparatus comprising: a first detection device configured to photogrammetrically detect a height of a curb; an encoder operably connected to the at least one wheel, the encoder being configured to generate a profile of wheel pulses detected by a wheel sensor during a driving maneuver for curbside parking in the predetermined parking area; a second detection device, the second detection device configured to detect a crossing of the curb by the at least one wheel, based on a change in position and orientation of the motor vehicle; and an odometry module configured to determine and execute a correction measure to modify the driving maneuver based on the correction measure to partially or fully automatically guide the vehicle during the crossing of the curb edge, the correction measure comprising a filtered function of the wheel pulses based on the photogrammetrically detected height of the curb during the crossing of the curb.

13. The apparatus of claim 12, wherein the first detection device comprises a camera, and the second detection device comprises one of an inclination device or echo sounder, configured to detect a change in position and orientation of the motor vehicle, wherein the odometry module is configured to determine and execute the corrective measure by adjusting a profile of the wheel pulses based on a height fraction caused by the height of the curb, and determine a motor vehicle position based at least in part on the adjusted profile of the wheel pulses.

14. A vehicle having a system for parking curbside, the curb having a height and an edge, the vehicle comprising: at least one wheel; a first detector configured to photogrammetrically detect a height of the curb; a second detector arranged to detect when the wheel crosses an edge of the curb, based on a change in position and orientation of the motor vehicle; an encoder operably connected to the wheel, the encoder outputting a series of encoder pulses as the wheel rotates; a guidance apparatus, configured to partially or fully automatically execute driving maneuvers for the vehicle; and a programmable circuit in data communication with the encoder, the first detector, the second detector, and the guidance apparatus, the programmable circuit configured to generate a first profile of encoder pulses corresponding to encoder pulses generated while the vehicle is parking, determine a number of additional encoder pulses, the number of additional encoder pulses corresponding to a change in elevation caused by the wheel crossing the edge of the curb during a driving maneuver while the vehicle is parking, determine the lateral distance traveled by the vehicle based at least in part on the first profile of encoder pulses and the number of additional encoder pulses, and determine a correction measure for the vehicle during the crossing of the edge of the curb, based at least in part on the first profile of encoder pulses and the number of additional encoder pulses, and execute a modified driving maneuver via the guidance apparatus, based on the correction measure, the correction measure being a filtered function of the encoder pulses and the number of additional encoder pulses based on the photogrammetrically detected height of the curb edge.

15. The vehicle of claim 14, wherein the programmable circuit is further configured to generate a second profile of encoder pulses, the second profile of encoder pulses corresponding to the first profile of encoder pulses and the number of additional encoder pulses, and determine the lateral distance traveled by the vehicle based at least in part on the second profile of encoder pulses.

16. The vehicle of claim 15, wherein the programmable circuit is configured to generate the second profile of encoder pulses by adjusting the first profile by a height fraction, the height fraction corresponding to the number of additional encoder pulses.

17. The vehicle of claim 14, wherein the programmable circuit is further configured to generate a first position based on the first profile of encoder pulses, and a second distance based on the number of additional encoder pulses, and the lateral distance traveled by subtracting the second distance from the first distance.

18. The vehicle of claim 14, wherein the programmable circuit is further configured to determine a first position based on the first profile of encoder pulses, generate a distance based on the number of additional encoder pulses, and determine a corrected position of the vehicle by subtracting the second distance from the provisional position.

19. The vehicle of claim 14, wherein the programmable circuit comprises an odometry module.

20. The vehicle of claim 14, wherein the first detector comprises a camera.

21. The vehicle of claim 20, wherein the programmable circuit is further configured to determine the height of the curb at least in part from the output of the camera, and the number of additional encoder pulses corresponds to the determined height of the curb.

22. The vehicle of claim 20, wherein the programmable circuit is further configured to generate a spatial profile of the curb at least in part from the output of the camera, and the number of additional encoder pulses corresponds to the spatial profile.

23. The vehicle of claim 22, wherein the programmable circuit is further configured to generate a three-dimensional model of the curb using structure-from-motion photogrammetry, and then generate the spatial profile from a three-dimensional model.

24. The vehicle of claim 22, wherein the programmable circuit is further configured to generate a two-dimensional image, determine if the two-dimensional image represents a curb, generate a three-dimensional model of the curb using structure-from-motion photogrammetry if the two-dimensional image represents a curb, and then generate the spatial profile from a three-dimensional model.

25. The vehicle of claim 22, wherein the programmable circuit is further configured to generate a two-dimensional image of the curb, and then determine the height of the curb at least in part from the two-dimensional image.

26. The vehicle of claim 14, wherein the second sensor comprises an echo sounder.

27. The vehicle of claim 14, wherein the second sensor comprises an inclination sensor.

* * * * *